(12) United States Patent
Marcus

(10) Patent No.: US 12,301,641 B1
(45) Date of Patent: *May 13, 2025

(54) SYSTEMS, METHODS, AND DEVICES FOR A PERSISTENT CONTENT SHARING PLATFORM

(71) Applicant: RGB SPECTRUM, Alameda, CA (US)

(72) Inventor: Daniel Amory Marcus, Oakland, CA (US)

(73) Assignee: RGB SPECTRUM, Alameda, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 18/481,749

(22) Filed: Oct. 5, 2023

Related U.S. Application Data

(63) Continuation of application No. 16/940,235, filed on Jul. 27, 2020, now Pat. No. 11,818,181.

(51) Int. Cl.
| | | |
|---|---|---|
| *G06F 15/16* | (2006.01) | |
| *G06F 3/04845* | (2022.01) | |
| *H04L 65/401* | (2022.01) | |
| *H04L 69/04* | (2022.01) | |

(52) U.S. Cl.
CPC ...... *H04L 65/4015* (2013.01); *G06F 3/04845* (2013.01); *H04L 69/04* (2013.01); *G06F 2203/04803* (2013.01)

(58) Field of Classification Search
CPC . H04L 65/4015; H04L 69/04; G06F 3/04845; G06F 2203/04803
See application file for complete search history.

(56) References Cited

U.S. PATENT DOCUMENTS

| | | | |
|---|---|---|---|
| 8,621,352 B2 | 12/2013 | Ding et al. | |
| 9,628,839 B1* | 4/2017 | Wodka | H04N 19/597 |
| 11,818,181 B1 | 11/2023 | Marcus | |
| 2009/0248737 A1* | 10/2009 | Shukla | G06F 9/44 |
| 2012/0173629 A1 | 7/2012 | Drope | |
| 2013/0151603 A1 | 6/2013 | Lobb et al. | |

(Continued)

OTHER PUBLICATIONS

U.S. Appl. No. 16/940,235, USPTO e-Office Action: CTNF—Non-Final Rejection, Dec. 22, 2022, 10 pages.

(Continued)

*Primary Examiner* — Abdullahi E Salad
(74) *Attorney, Agent, or Firm* — Kwan & Olynick LLP

(57) ABSTRACT

System, methods, and devices provide prioritized scaling for persistent content sharing platforms. Systems include a processing device comprising one or more processors configured to generate a first display configured to represent a private computing environment associated with a user, and configured to generate a second display configured to represent a shared computing environment associated with the user. Systems further include an encoder configured to generate a packetized data stream representing the second display. Systems also include a multiview module comprising a decoder configured to generate a third display configured to represent a unified view of a plurality of active shared computing environments associated with a plurality of users, the decoder being further configured to decode at least one packetized data stream representing at least one of the plurality of active shared computing environments.

20 Claims, 9 Drawing Sheets

(56) References Cited

U.S. PATENT DOCUMENTS

| | | | | |
|---|---|---|---|---|
| 2014/0240445 A1* | 8/2014 | Jaynes | ............ | G09G 5/14 |
| | | | | 348/14.07 |
| 2015/0254048 A1* | 9/2015 | Morton | ............ | G09G 5/363 |
| | | | | 345/2.2 |
| 2016/0284105 A1* | 9/2016 | Dawood | ............ | H04N 19/137 |
| 2018/0063214 A1* | 3/2018 | Ko | ............ | H04N 21/4622 |
| 2021/0135895 A1* | 5/2021 | Cheung | ............ | G06F 3/0304 |

OTHER PUBLICATIONS

U.S. Appl. No. 16/940,235, USPTO e-Office Action: NOA—Notice of Allowance and Fees Due (Ptol-85), Jul. 10, 2023, 7 pages.
Ramses vanZon, et al., Software-Enhanced Teaching and Visualization Capabilities of an Ultra-High-Resolution Video Wall, PEARC '19, Jul. 28-Aug. 1, 2019, Chicago, IL, 7 pages.

\* cited by examiner

SYSTEMS, METHODS, AND DEVICES FOR A PERSISTENT CONTENT SHARING PLATFORM

CROSS-REFERENCE TO RELATED APPLICATION

This application is a continuation of and claims priority to co-pending U.S. patent application Ser. No. 16/940,235 (RGBSP0011), filed Jul. 27, 2020, titled "SYSTEMS, METHODS, AND DEVICES FOR A PERSISTENT CONTENT SHARING PLATFORM," which is incorporated herein by this reference for all purposes.

TECHNICAL FIELD

The present disclosure relates to the field of computing platforms, and more particularly to content sharing within a computing platform.

DESCRIPTION OF RELATED ART

Online computing platforms may be used to provide software applications in distributed contexts for users distributed across a geographical region. For example, distributed software applications may be cloud computing services that are implemented as software as a service (SaaS) platforms. Accordingly, users may work remotely in a distributed environment where they are separated geographically, but they may still collaborate on various projects using distributed applications. Conventional computing platforms remain limited because they are not able to effectively provide shared workspaces for collaborating in distributed contexts. Moreover, such conventional computing platforms are not able to provide shared workspaces in a manner that is compatible with existing videoconferencing software.

SUMMARY

Disclosed herein are systems, methods, and devices for scaling for persistent content sharing platforms. Systems include a processing device comprising one or more processors configured to generate a first display configured to represent a private computing environment associated with a user, and configured to generate a second display configured to represent a shared computing environment associated with the user. Systems further include an encoder configured to generate a packetized data stream representing the second display. Systems also include a multiview module comprising a decoder configured to generate a third display configured to represent a unified view of a plurality of active shared computing environments associated with a plurality of users, the decoder being further configured to decode at least one packetized data stream representing at least one of the plurality of active shared computing environments.

In some embodiments, the shared computing environment is a shared workspace in a content sharing computing platform, and the unified view comprises a plurality of display windows each representing one of the plurality of active shared computing environments. In various embodiments, the processing device, the encoder, and the multiview module are implemented within a personal computer. According to some embodiments, the decoder is configured to simultaneously decode at least two of the plurality of packetized data streams. In some embodiments, contents for the first display and contents for the second display are determined based on a user input received at the processing device. In various embodiments, the first display is included in a plurality of first displays, the second display is included in a plurality of second displays, the third display is included in a plurality of third displays, and a number of first displays, a number of second displays, and a number of third displays are scalable. According to some embodiments, the encoder and the multiview module are included in a single device. In some embodiments, the encoder is configured to implement lossless compression, and the encoder and decoder are coupled to a packet switching network. In various embodiments, the first display and the third display are displayed in a single monitor.

Also disclosed herein are methods that include determining a plurality of configuration parameters associated with a content sharing computing platform, the plurality of configuration parameters identifying a plurality of users, and generating, using one or more processors of a processing device, a first display capable of representing a private computing environment associated with a user of the plurality of users, and a second display capable of representing a shared computing environment associated with the user. The methods also include generating, using an encoder, a packetized data stream representing the second display, and generating, using a multiview module comprising a decoder, a third display capable of representing a view of at least one of a plurality of active shared computing environments associated with the plurality of users.

In some embodiments, the shared computing environment is a shared workspace in a content sharing computing platform, and the unified view comprises a plurality of display windows each representing one of the plurality of active shared computing environments. In various embodiments, the generating of the second display further includes generating a packetized data stream representing the second display, and the generating of the third display further includes decoding a plurality of packetized data streams representing the plurality of active shared computing environments. According to some embodiments, the generating of the third display includes decoding, using the decoder, at least two of the plurality of packetized data streams simultaneously. In some embodiments, contents for the first display and contents for the second display are determined based on a user input received at the processing device. In various embodiments, the first display is included in a plurality of first displays, the second display is included in a plurality of second displays, the third display is included in a plurality of third displays, and a number of first displays, a number of second displays, and a number of third displays are scalable.

Further disclosed herein are devices that include one or more processors configured to generate a first display capable of displaying a private computing environment associated with a user, and configured to generate a second display configured to represent a shared computing environment associated with the user, an encoder configured to generate a packetized data stream representing the second display, and a decoder configured to generate a third display configured to represent a view of at least one of a plurality of active shared computing environments associated with a plurality of users, the decoder being further configured to decode at least one of a plurality of packetized data streams representing the plurality of active shared computing environments. Devices also include a communications interface configured to couple the encoder and the decoder to a communications network.

In some embodiments, the shared computing environment is a shared workspace in a content sharing computing platform, and the unified view comprises a plurality of display windows each representing one of the plurality of active shared computing environments. In various embodiments, contents for the first display and contents for the second display are determined based on a user input. According to some embodiments, the first display is included in a plurality of first displays, the second display is included in a plurality of second displays, the third display is included in a plurality of third displays, and a number of first displays, a number of second displays, and a number of third displays are scalable. In some embodiments, the encoder, the decoder, and the communications interface are included within a personal computer.

DETAILED DESCRIPTION

Reference will now be made in detail to some specific examples including the best modes contemplated by the inventors. Examples of these specific embodiments are illustrated in the accompanying drawings. While particular embodiments are described, it will be understood that they are not intended to be limiting. On the contrary, they are intended to cover alternatives, modifications, and equivalents as may be included within the spirit and scope of the disclosure as defined by the appended claims.

Remote working environments may enable users to work from remote locations while still accessing various applications, such as SaaS applications. In such situations, users may be distributed such that they are separated geographically. Such users may be limited in their ability to work remotely while still having access to a shared workspace or environment in which they may collaborate with other users. Moreover, supervisors and managers may be limited in their ability to oversee activities of users that are working remotely. Further still, such conventional remote working environments do not provide a shared workspace that may be implemented efficiently and persistently despite the operations of other applications implemented in the remote working environment.

Embodiments disclosed herein provide the ability to create a persistently shared workspace that provides users with the ability to manage their own private computing environment while also having access to a persistently shared computing environment that allows them to collaborate with other users. As will be discussed in greater detail below, multiple displays may be generated for a user for the private and shared computing environments, also referred to herein as workspaces. Moreover, a third display may be generated that includes numerous windows, each displaying a shared workspace of a user. Accordingly, the third display provides a unified view of all the shared workspaces in a group of users. In this way, both private and public workspaces may be generated and persistently maintained while also enabling supervisory capabilities.

Figure 1:
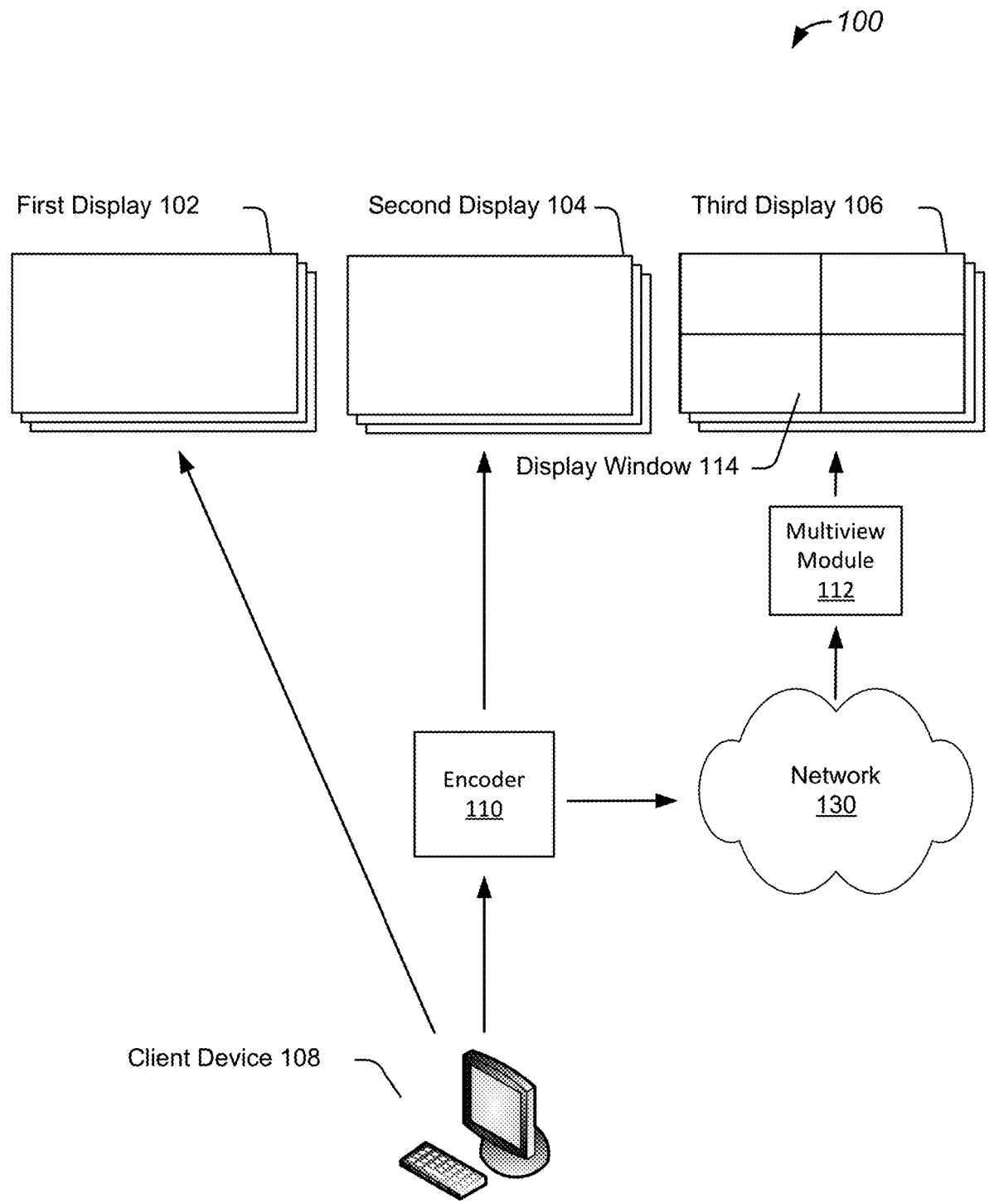
FIG. 1 illustrates an example of a system for implementing a content sharing platform, configured in accordance with some embodiments.

FIG. 1 illustrates an example of a system for implementing a content sharing platform, configured in accordance with some embodiments. In various embodiments, a content sharing platform is implemented using a system, such as system 100, which includes various display spaces and associated hardware. In this way, a user may utilize a client device, such as client device 108, which may be a computer, and may be provided with a private workspace as well as a shared workspace that is persistently shared with other users that may be identified based on a designated grouping. As will be discussed in greater detail below, the persistent sharing may be implemented regardless of initiation or termination of associated applications, and may also enable the implementation of a unified view of shared workspaces by another entity, such as a supervisor. Moreover, content sharing platforms described herein enable the combination of remote and local workspaces, as well as the combination of remote and local content in the same display.

Accordingly, system 100 includes multiple display spaces, such as first display 102, second display 104, and third display 106 which are coupled to client device 108 via one or more other components, such as encoder 110 and multiview module 112 that are configured to facilitate the implementation of the different display spaces. In some embodiments, first display 102 is configured to implement a private computing environment that may be configured based on one or more privacy and/or security settings. For example, first display 102 may be a private display that is configured to be viewable and accessible only by a user of client device 108. Such operability and accessibility may be implemented via one or more authentication operations that occur during a login to the content sharing platform. In some embodiments, first display 102 has its own dedicated display device, such as a computer monitor, that is coupled to client device 108.

In some embodiments, first display 102, as well as other displays discussed in greater detail below, are display windows that may be resized and dragged by a user around a desktop of a computer. In this way, multiple displays, such as first display 102 and third display 106 discussed below, may be displayed in a single display device, such as a monitor. In various embodiments, client device 108 may be configured as a personal computer, such as a multiheaded personal computer, or may be configured as a workstation. In this way, client device 108 may be configured as a remote terminal operation by a user, or a multi-user work terminal implemented in a work environment of an organization, such as an office space. In some embodiments, client device 108 includes a communications interface configured to support a data connection with one or more entities, such as communications service providers. For example, client device 108 may include a communications interface that supports a data connection over a mobile network, such as a 5G network, with one or more telecommunications service providers. In this way, client device 108 may support multiple different data connection modalities, and such different data connection modalities may be used to support one or more displays.

As noted above, system 100 additionally includes second display 104 which is configured to implement a shared computing environment. In various embodiments, the shared environment is accessible and viewable by other entities within the content sharing platform. Thus, content displayed in second display 104 may be viewable by other entities also using the content sharing platform provided by system 100. In various embodiments, the user of client device 108 has access and control over both first display 102 and second display 104, and is able to determine what is displayed in each respective display. In this way, the user is provided with both a private computing environment and a shared computing environment, also referred to herein as a workspace, and client device 108 is able to determine what is displayed in which computing environment based on a user input received from the user. As will be discussed in greater detail below, the user may be using various applications, such as productivity tools, and the user may determine where windows for such applications are displayed by, for example, dragging the window to a particular display. As similarly discussed above, second display 104 may have its own dedicated display device, such as a computer monitor In various embodiments, second display 104 is coupled to encoder 110, which is coupled to client device 108 as well as a communications network such as network 130. According to some embodiments, such coupling may be implemented using a communications interface, such as an Ethernet interface. In various embodiments, encoder 110 is configured to convert an output of second display 104 into a packetized data stream capable of network transmission via network 130, which may be a network such as the internet. Accordingly, encoder 110 is configured to packetize data received from second display 104, and is configured to generate a data stream capable of transmission via network 130. In some embodiments, encoder 110 is configured to generate the data stream using lossless compression. As will be discussed in greater detail below, the data stream may be received and used to generate a unified view of multiple shared computing environments. Moreover, encoder 110 and multiview module 112, discussed in greater detail below, may have network identifiers that may be stored and maintained in a central location, such as a datastore of the organization.

As also noted above, system 100 further includes third display 106 which is capable of being configured to include multiple display windows, such as display window 114, that each are associated with at least one shared computing environment. Accordingly, third display 106 may be configured to provide a unified view of all active shared computing environments that may be used by different client devices, as will be discussed in greater detail below with reference to FIG. 5. As shown in FIG. 1, third display 106 may be coupled to multiview module 112, which is configured to receive various data streams via a communications network, such as network 130. In this way, multiview module 112 may selectively receive multiple data streams from encoders, such as encoder 110, and may convert the received data streams into video streams capable of being displayed in a display, such as third display 106. In various embodiments, multiview module 112 is configured to retrieve network identifiers associated with such data streams from a central repository, such as a datastore of the organization, and based on user identifiers included in a user grouping, as will be discussed in greater detail below. In some embodiments, multiview module 112 includes a decoder that is configured to decode the received data streams. In one example, the decoder is configured to decode, display, and scale different data streams at different resolutions. For example, one display may have a high resolution, while the others are low resolution thumbnails. In a specific example, the decoder is configured to simultaneously decode the multiple data streams for the active shared computing environments. In this way, third display 106 provides a simultaneous view of multiple different shared computing environments operated by different users within a designated group. Moreover, as discussed above, third display 106 may be displayed in a same display device as other displays, such as first display 102. In this way, both locally generated content associated with one user may be displayed along with shared content from other users in a single display device, such as a monitor.

As shown in FIG. 1, it will be appreciated that any suitable number of displays may be utilized. For example, there may be multiple first displays 102, multiple second displays 104, and multiple third displays 106 to facilitate the implementation of larger and more complex shared computing environments within a content sharing platform. In this way, and as will be discussed in greater detail below with reference to FIG. 5, a number of client devices and displays may be scalable, and may be increased or decreased based on a number of active users of system 100. As will be discussed in greater detail below, user identifiers and configuration parameters may be used to identify a number of users, and identify a number of first displays, second displays, and third displays that should be implemented.

Figure 2:
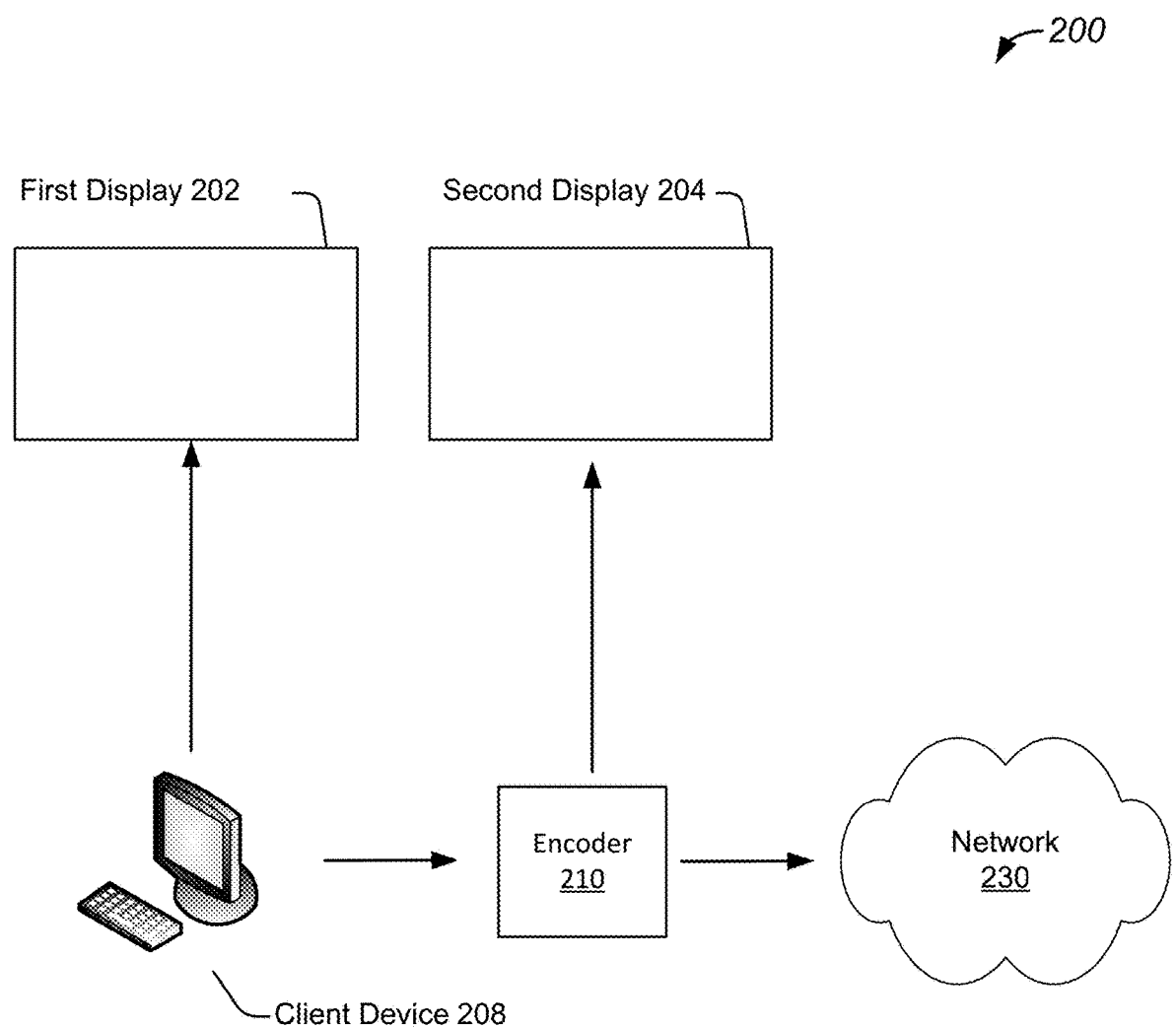
FIG. 2 illustrates another example of a system for implementing a content sharing platform, configured in accordance with some embodiments.

FIG. 2 illustrates another example of a system for implementing a content sharing platform, configured in accordance with some embodiments. As similarly discussed above, a content sharing platform may be implemented to provide a user with both a private computing environment and a shared computing environment. Accordingly, a content sharing platform is implemented using a system, such as system 200, which includes various display spaces and associated hardware that are used to provide the user with a private workspace as well as a shared workspace that is persistently shared with other users who may be identified based on a designated grouping.

As similarly discussed above, system 200 may include a client device, such as client device 208, that is coupled to first display 202 and second display 204. Furthermore, second display 204 may be coupled to client device 208 via encoder 210. Moreover, encoder 210 may be coupled to a communications network such as communications network 230. As shown in FIG. 2, first display 202 and second display 204 may be implemented independent of a third display. Accordingly, embodiments described herein may be configured such that displays coupled to client devices associated with users are implemented as standalone systems that may then be communicatively coupled to other users to provide persistent sharing of a computing environment, such as that of second display 204, with those other users.

Figure 3:
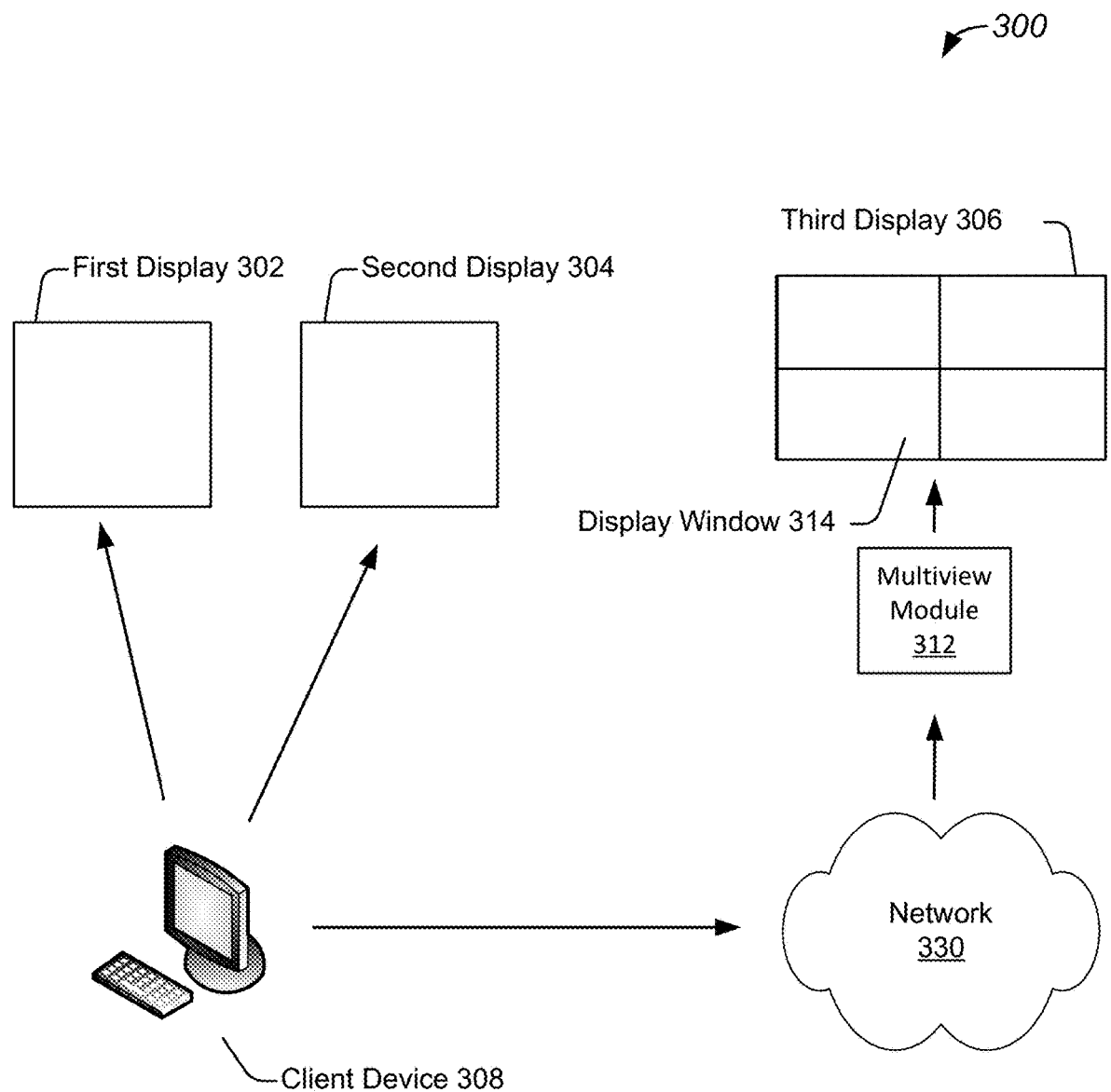
FIG. 3 illustrates yet another example of a system for implementing a content sharing platform, configured in accordance with some embodiments.

FIG. 3 illustrates yet another example of a system for implementing a content sharing platform, configured in accordance with some embodiments. As similarly discussed above, a content sharing platform may provide a user with a private computing environment and a shared computing environment. As shown in FIG. 3, according to some embodiments, the content sharing platform is implemented using a system, such as system 300, which includes various display spaces and associated hardware that are used to provide the user with a stand-alone persistently shared computing environment.

As similarly discussed above, system 300 may include a client device, such as client device 308, that is coupled to first display 302, second display 304, and third display 306. In various embodiments, client device 308 is coupled to a communications network, such as communications network 330, and is configured to implement the encoding operations to generate a data stream capable of network transmissions. Accordingly, client device 308 may be specifically configured to implement the private computing environment associated with first display 302 as well as the shared computing environment associated with second display 304, and no hardware external to client device 308 is used for such computing environments. Moreover, according to some embodiments, second display 304 and third display 306 are implemented independent of first display 302. Thus, systems disclosed herein may be configured such that a computing environment of the user is always a shared computing environment which is persistently shared with a unified display provided by third display 306 and multiview module 312, and do not utilize a first display for a private computing environment.

Figure 4:
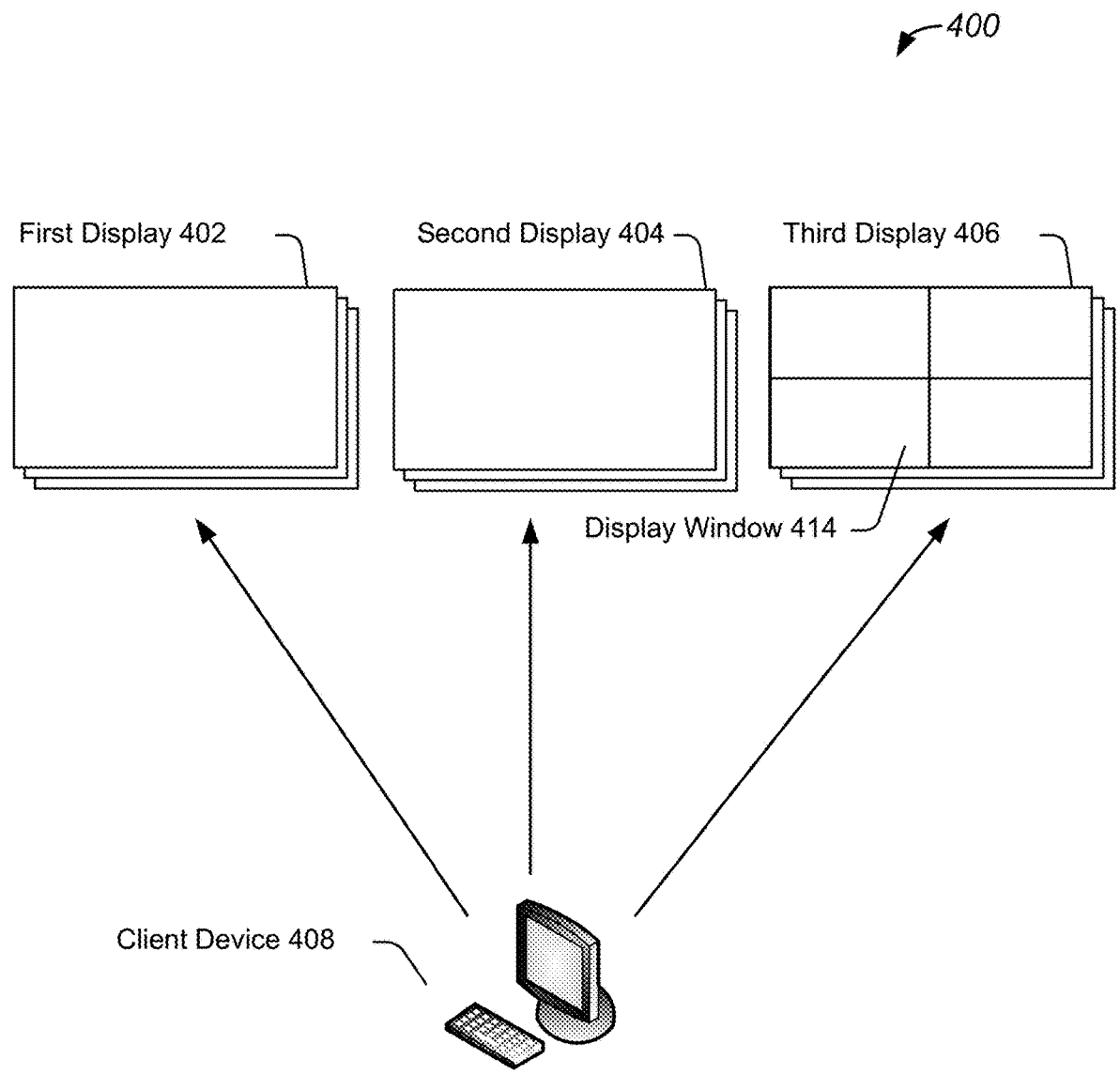
FIG. 4 illustrates an additional example of a system for implementing a content sharing platform, configured in accordance with some embodiments.

FIG. 4 illustrates an additional example of a system for implementing a content sharing platform, configured in accordance with some embodiments. As similarly discussed above, a content sharing platform is implemented using a system, such as system 400, which includes various display spaces and associated hardware. In this way, a user may utilize a client device, such a client device 408, which may be a computer, and may be provided with a private workspace as well as a shared workspace that is persistently shared with other users who may be identified based on a designated grouping. As will be discussed in greater detail below, client device 408 may also be configured to implement a unified view that includes visibility of other shared workspaces.

As shown in FIG. 4, system 400 includes multiple display spaces, such as first display 402, second display 404, and third display 406 which are coupled to client device 408. As also similarly discussed above, first display 402 is configured to implement a private computing environment that may be configured based on one or more privacy and/or security settings, second display 404 is configured to implement a shared computing environment, and third display 406 is configured to include multiple display windows, such as display window 414, that each are associated with at least one shared computing environment. As shown in FIG. 4, there may be multiple displays for each of first display 402, second display 404, and third display 406.

In various embodiments, client device 408 is communicatively coupled to first display 402, second display 404, and third display 406, and is configured to implement operations that would otherwise be implemented using a separate encoder and multiview module. Accordingly, client device 408 may be a computer or processing system that is additionally configured to encode data streams for network transmission, and also implement a unified view of shared computing environments. In this way, client device 408 may be configured to implement both the private computing environment and shared computing environment capabilities discussed above, and may also be configured to implement the unified view of multiple shared computing environments. Accordingly, the user of client device 408 may also be provided with the supervisory capabilities provided by third display 406.

Figure 5:
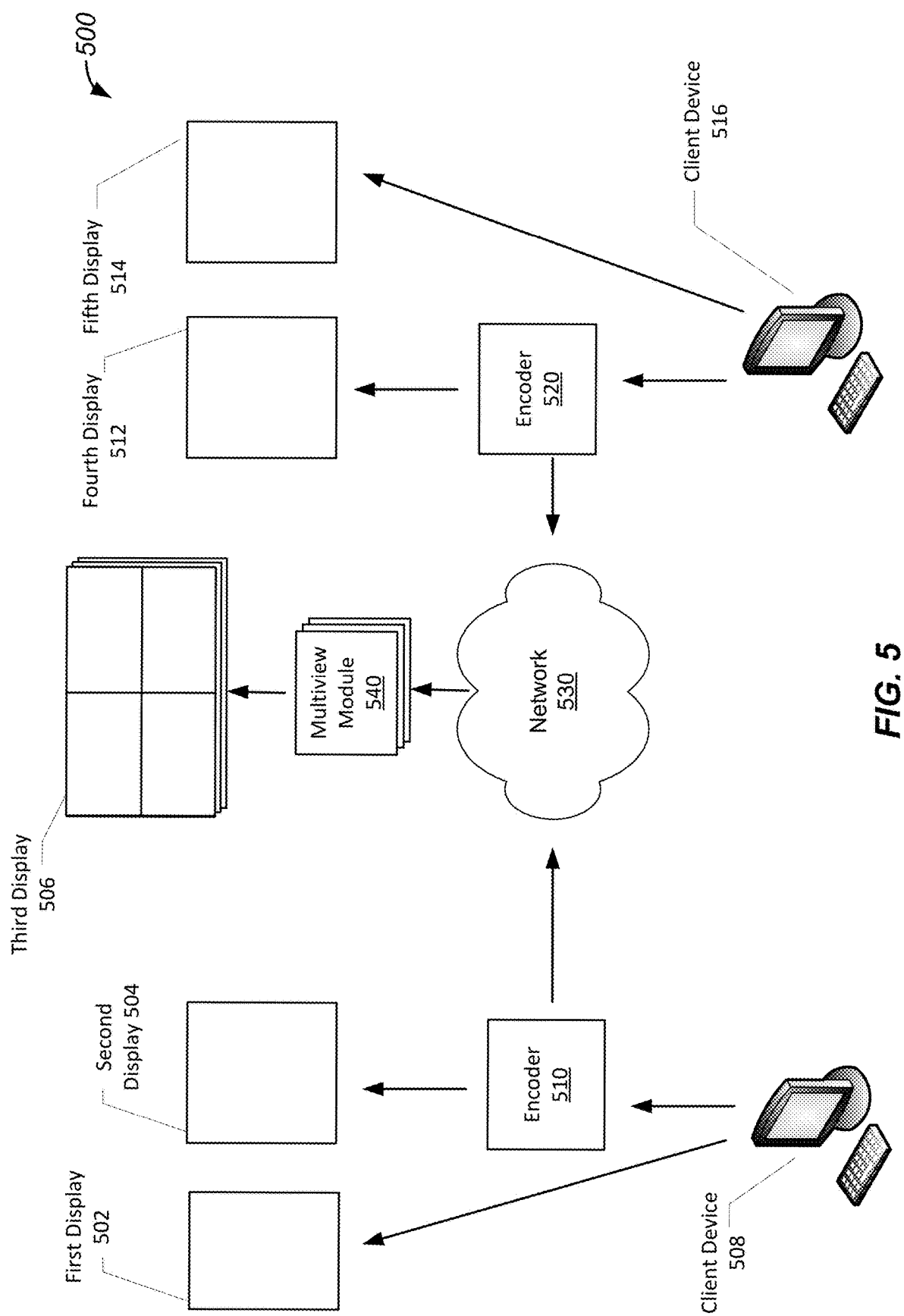
FIG. 5 illustrates another example of a system for implementing a content sharing platform, configured in accordance with some embodiments.

FIG. 5 illustrates another example of a system for implementing a content sharing platform, configured in accordance with some embodiments. As similarly discussed above, a content sharing platform is implemented using a system, such as system 500, which includes various display spaces and associated hardware. As shown in FIG. 5, system 500 may be implemented such that multiple client devices as well as multiple displays are implemented in a distributed environment. In this way, multiple users may be distributed geographically in different locations, but may be included in the same shared computing environment. Moreover, such network connectivity additionally enables the implementation of coupling with distributed applications provided by application providers, such as those associated with cloud computing services and software as a service (SaaS) platforms.

Accordingly, system 500 includes multiple display spaces, such as first display 502, second display 504, and third display 506 which are coupled to client device 508 via one or more other components, such as encoder 510 and multiview module 540. System 500 further includes fourth display 512 and fifth display 514 which are coupled to client device 516 via one or more other components, such as encoder 520 and multiview module 540. Moreover, components, such as encoder 510, encoder 520, and multiview module 540, may be coupled via a communications network, such as network 530.

As similarly discussed above, first display 502 and fourth display 512 are configured to implement private computing environments that may be configured based on one or more privacy and/or security settings, second display 504 and fifth display 514 are configured to implement a shared computing environments, and third display 506 is configured to include multiple display windows that each are associated with at least one shared computing environment. Accordingly, multiview module 540 is configured to receive and multiplex, if appropriate, data streams received from various different users that may be distributed across a network, and is further configured to generate a unified view of the received data streams that is displayed in third display 506, as similarly discussed above.

Figure 6:
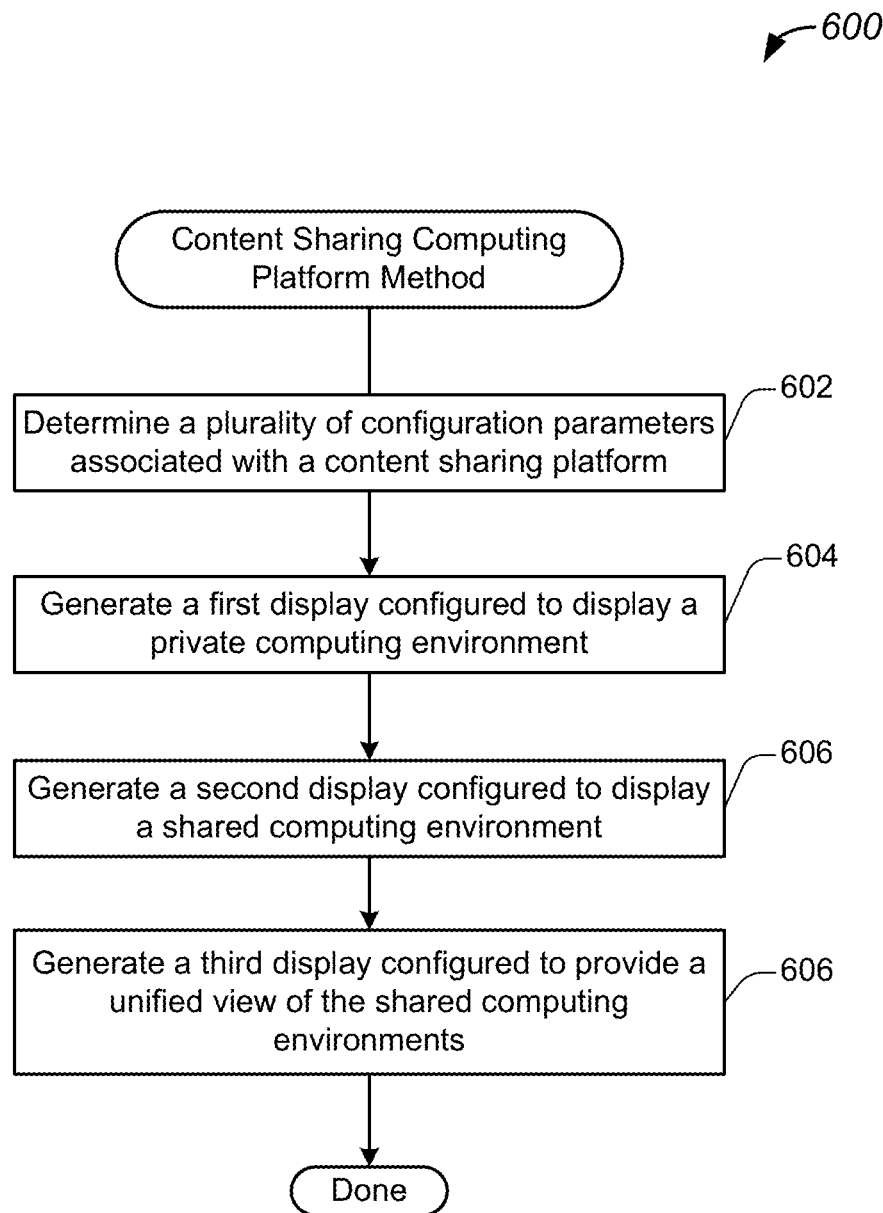
FIG. 6 illustrates a flow chart of an example of a method for implementing a content sharing platform in accordance with some embodiments.

FIG. 6 illustrates a flow chart of an example of a method for implementing a content sharing platform in accordance with some embodiments. As similarly discussed above, a content sharing platform may be implemented to provide persistent content sharing between users. As will be discussed in greater detail below, a method, such as method 600, may be implemented to setup various workspaces for such a content sharing platform and generate a unified view of such shared workspaces.

Accordingly, method 600 may commence with operation 602, during which a plurality of configuration parameters may be determined. In various embodiments, the configuration parameters may identify one or more aspects of the content sharing platform that are used to generate the various workspaces included in the content sharing platform. More specifically, the configuration parameters may include user identifiers that identify one or more users, device and software identifiers associated with the users, as well as one or more application identifiers that represent application information, such as access information, for each user for a particular set of applications, such as SaaS applications.

Method 600 may proceed to operation 604 during which a first display may be generated. As similarly discussed above, the first display is configured to implement a private computing environment that may be configured based on one or more privacy and/or security settings. Accordingly, the first display may be a private display that is configured to be viewable and accessible only by a user of a particular client device. In various embodiments, during operation 604, a first display is generated for each user identified during operation 602.

Method 600 may proceed to operation 606 during which a second display may be generated, which is configured to implement a shared computing environment. As discussed above, the shared computing environment is accessible and viewable by other entities within the content sharing platform. Thus, content displayed in the second display may be viewable by other entities also using the content sharing platform. As also discussed above, during operation 606, a second display is generated for each user identified during operation 602. In this way, each user may be provided with a first display and a second display.

Method 600 may proceed to operation 608 during which a third display may be generated. As also discussed above, the third display includes multiple display windows that are each associated with at least one shared computing environment. Accordingly, the third display provides a unified view of all active shared computing environments that were generated during operation 606. As will be discussed in greater detail below, the generation and representation of the display windows may be configurable, and may also include various additional information, such as user identifier and role information. For example, the size, order, and arrangement of the display windows may be configured by a user of the third display. Moreover, the display windows may be overlaid with additional information such as a user identifier and a team identifier. In various embodiments, the overlaid information may be configured by the user of the third display via a user input provided to a user interface.

Figure 7:
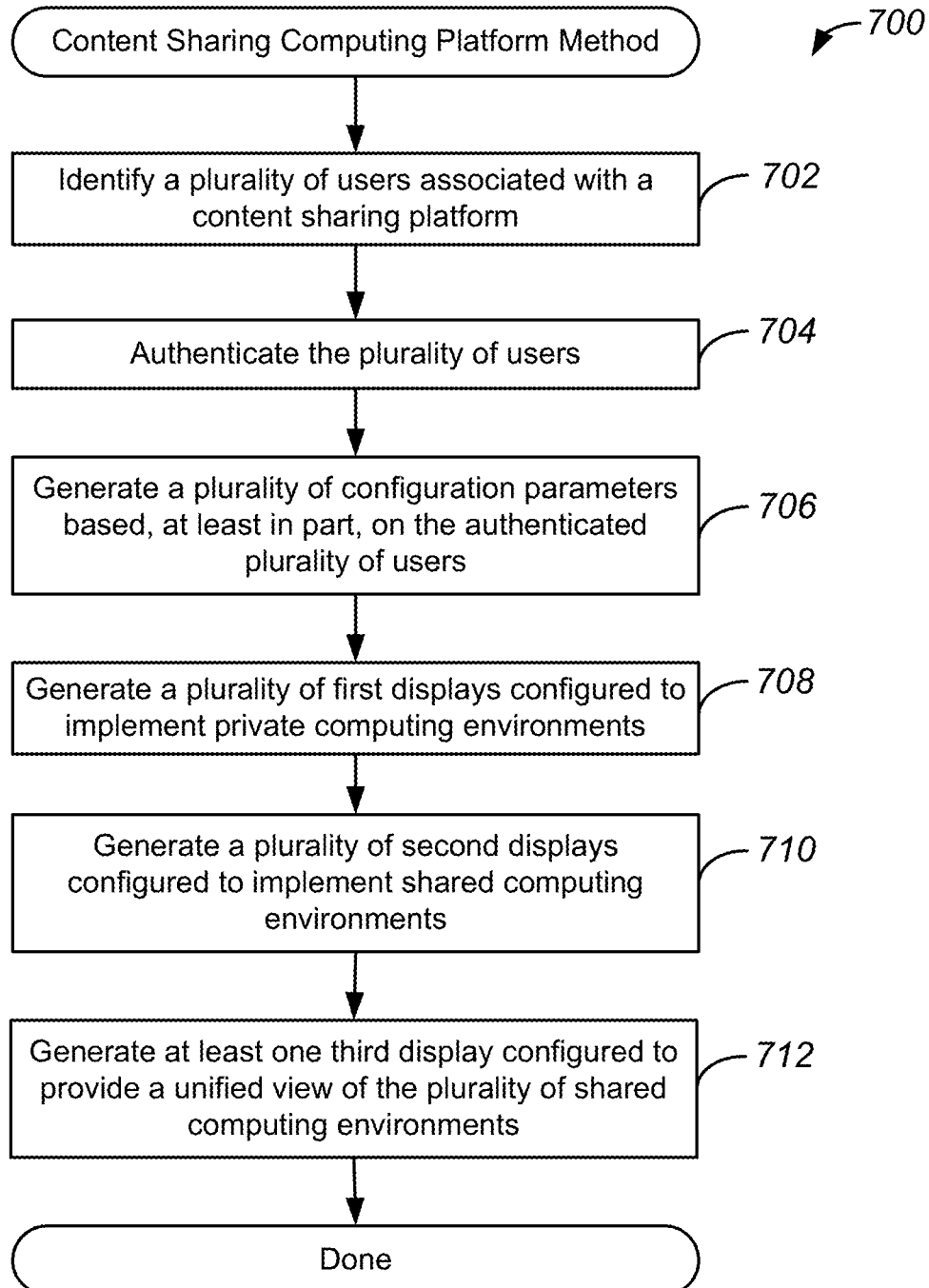
FIG. 7 illustrates a flow chart of another example of a method for implementing a content sharing platform in accordance with some embodiments.

FIG. 7 illustrates a flow chart of another example of a method for implementing a content sharing platform in accordance with some embodiments. As similarly discussed above, a content sharing platform may be implemented to provide persistent content sharing between users. As will be discussed in greater detail below, a method, such as method 700, may be implemented for numerous users. Accordingly, workspaces may be specifically configured for designated groups of users, and displays may be generated for each user in the designated group.

Accordingly, method 700 may commence with operation 702 during which a plurality of users may be identified. In various embodiments, the users may be members of an organization, such as a company, that are collectively working on a particular project or in a particular context, such as a department of the organization. Such users may typically share a work environment, and may thus be identified for a shared workspace. In various embodiments, the users may be identified based on one or more unique user identifiers, as well as user parameters that represent their organization and their role within the organization. Furthermore, the users may be identified based on one or more group parameters designated by an entity, such as a supervisor or administrator. Accordingly, a supervisor may identify and store an indication of which users should be included in a shared computing environment. In some embodiments, the group parameters may be inferred based on metadata or user profile data associated with the users. For example, data stored within a datastore of the organization may identify the users as all having a same department, a same role within the organization, or a same work address. In such situations, a system component, such as a client device, may be used to generate one or more user groupings based on such available user and organization information.

Method 700 may proceed to operation 704 during which the plurality of users may be authenticated. Accordingly, one or more authentication operations may be implemented to ensure secure access to the content sharing platform. In various embodiments, the authentication operations may include the entry and validation of login information. It will be appreciated that any suitable authentication modality may be implemented. In various embodiments, the authentication information may also be used to configure one or more aspects of the subsequently generated computing environments, such as access to a particular software application. More specifically, the authentication information may be used to determine if displays generated for the user should allow access to a particular software application based on whether or not that user is a licensed user.

Method 700 may proceed to operation 706 during which a plurality of configuration parameters may be generated based, at least in part, on the authenticated plurality of users. In various embodiments, the configuration parameters are parameters that may be used to customize the generation of a display for a user. Accordingly, the configuration parameters may identify specific aspects of workspaces and computing environments that have been specifically configured based on the previously described information about the user. In one example, the configuration parameters identify which displays should be generated for each user, as well as which users should be included in a unified display, and how the unified display should be implemented.

Method 700 may proceed to operation 708 during which a plurality of first displays may be generated. As similarly discussed above, the first display is configured to implement a private computing environment that may be configured based on one or more privacy and/or security settings. Accordingly, the first display may be a private display which is configured to be viewable and accessible only by a user of a particular client device. In various embodiments, during operation 708, a first display is generated for each user identified during operation 702 and in accordance with the configuration parameters generated during operation 706. In this way, first displays may be generated for the appropriate users in an identified group of users.

Method 700 may proceed to operation 710 during which a plurality of second displays may be generated. As discussed above, the shared computing environment is accessible and viewable by other entities within the content sharing platform. Thus, content displayed in the second display may be viewable by other entities also using the content sharing platform. Accordingly, during operation 710, a second display is generated for each user identified during operation 702, and second displays are generated for the appropriate users in the identified group of users.

Method 700 may proceed to operation 712 during which a third display may be generated. As also discussed above, the third display includes multiple display windows that are each associated with at least one shared computing environment. Accordingly, the third display provides a unified view of all active shared computing environments that were generated during operation 710. In various embodiments, the third display is generated based at least in part on the configuration parameters. Accordingly, the third display may have a number of windows, a size of windows, an arrangement of windows, as well as metadata and overlaid information that are all configured based on the configuration parameters. In this way, the third display and the unified representation of the shared computing environments may be customized based on one or more inputs and parameters specified by and entity, such as a supervisor or an administrator.

Figure 8:
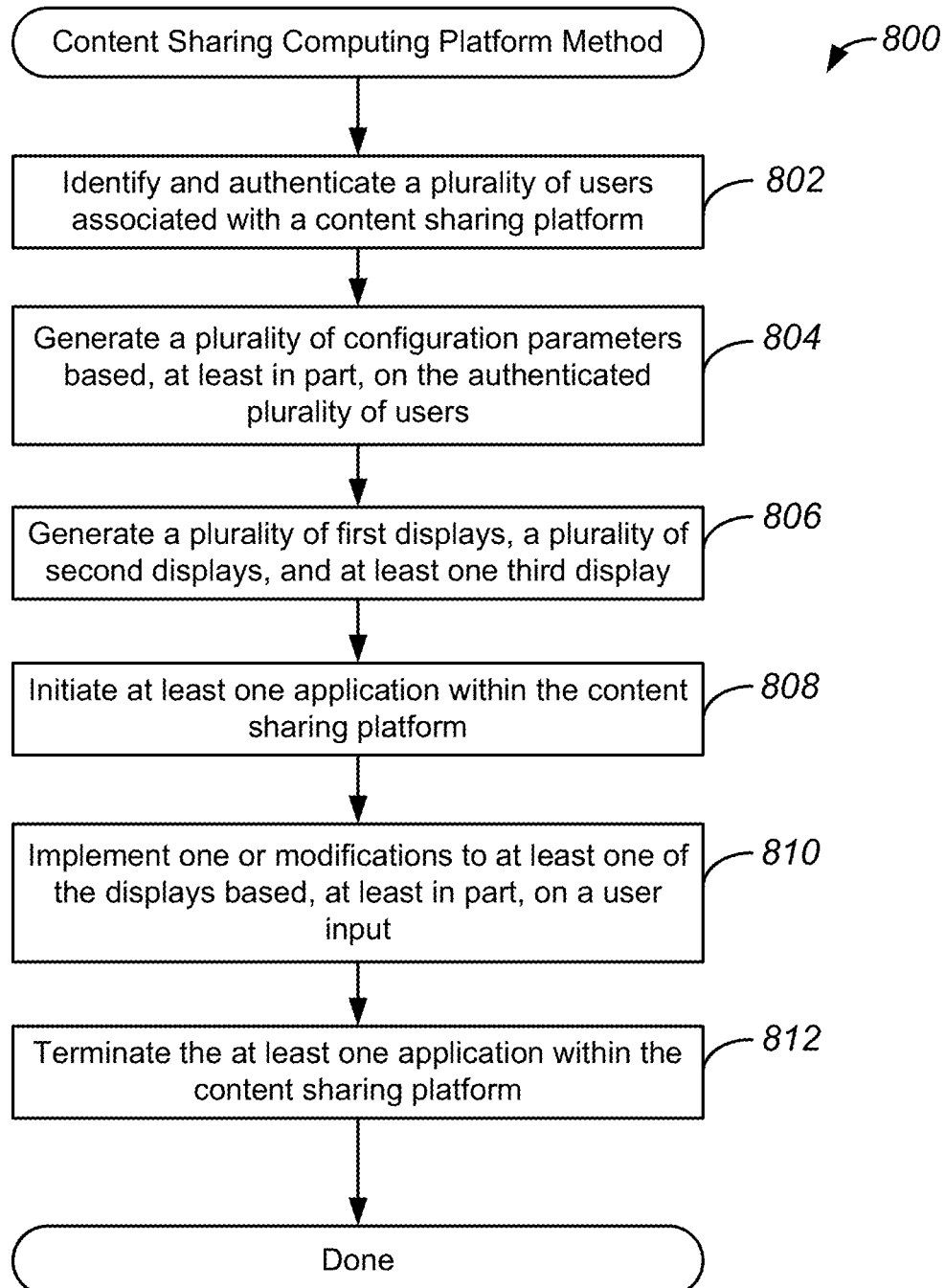
FIG. 8 illustrates a flow chart of yet another example of a method for implementing a content sharing platform in accordance with some embodiments.

FIG. 8 illustrates a flow chart of yet another example of a method for implementing a content sharing platform in accordance with some embodiments. As similarly discussed above, a content sharing platform may be implemented to provide persistent content sharing between users. As will be discussed in greater detail below, a method, such as method 800, may be implemented for numerous users and used to maintain shared computing environments independent of the initiation and termination of distributed software applications within the content sharing platform.

Accordingly, method 800 may commence with operation 802 during which a plurality of users may be identified and authenticated. As discussed above, the users may be members of an organization who are collectively working on a particular project or in a particular context, such as a department of the organization. Accordingly, the users may be identified based on one or more unique user identifiers, as well as user parameters that represent their organization and their role within the organization. Furthermore, the users may be identified based on one or more group parameters designated by an entity, such as a supervisor or administrator. Moreover, as discussed above, one or more authentication operations may be implemented for each of the identified users.

Method 800 may proceed to operation 804 during which a plurality of configuration parameters may be generated based, at least in part, on the authenticated plurality of users. As similarly discussed above, the configuration parameters are parameters that may be used to customize the generation of a display for a user. Accordingly, the configuration parameters may be generated to identify specific aspects of workspaces and computing environments that have been specifically configured based on the previously described information about the user.

Method 800 may proceed to operation 806 during which a plurality of first displays may be generated, a plurality of second displays may be generated, and at least one third display may be generated. As similarly discussed above, the first displays are configured to implement private computing environments for the users, the second displays are configured to implement shared computing environments for the users, and at least one third display is configured to provide a unified view of all active shared computing environments. Accordingly, during operation 806, all of the displays may be generated for the group of users as well as any associated entity, such as a supervisor or administrator.

Method 800 may proceed to operation 808 during which an application may be initiated. As discussed above, the content sharing platform is configured to support each client device operating one or more applications, which may be distributed applications provided by cloud-based service providers. Accordingly, during operation 808, such an application may be initiated, or a particular session of an application may be initiated. For example, the application may be a video conferencing application that provides users with video and audio communication. In this example, the initiation of a session may be the initiation of a video conference. In another example, the application may be a productivity application and the initiation of the session may be the opening of a shared document. In various embodiments, the application may be initiated by a single user at his or her client device. In some embodiments, the application may be initiated for multiple users by another entity, such as a supervisor.

Method 800 may proceed to operation 810 during which one or more modifications to the displays may be made. As discussed above, the displays may be configurable based on user-defined inputs and parameters. Accordingly, each of the users associated with the initiation of the application may configure the display of the application to either be in the first display and private, or in the second display and shared. The users may also customize other aspects of the display of the application, such as sizing of the window, as well as an arrangement of windows within the display.

Method 800 may proceed to operation 812 during which the application session may be terminated. Accordingly, once the users are finished using the application, it may be terminated and the window associated with the application may be closed. In various embodiments, the first display, second display, and third display continue to be generated even after termination of the application. In this way, the first display, second display, and third display provide a shared view of the users' workspaces and computing environments that is independent of the initiation and termination of applications, and persists between sessions of applications.

Figure 9:
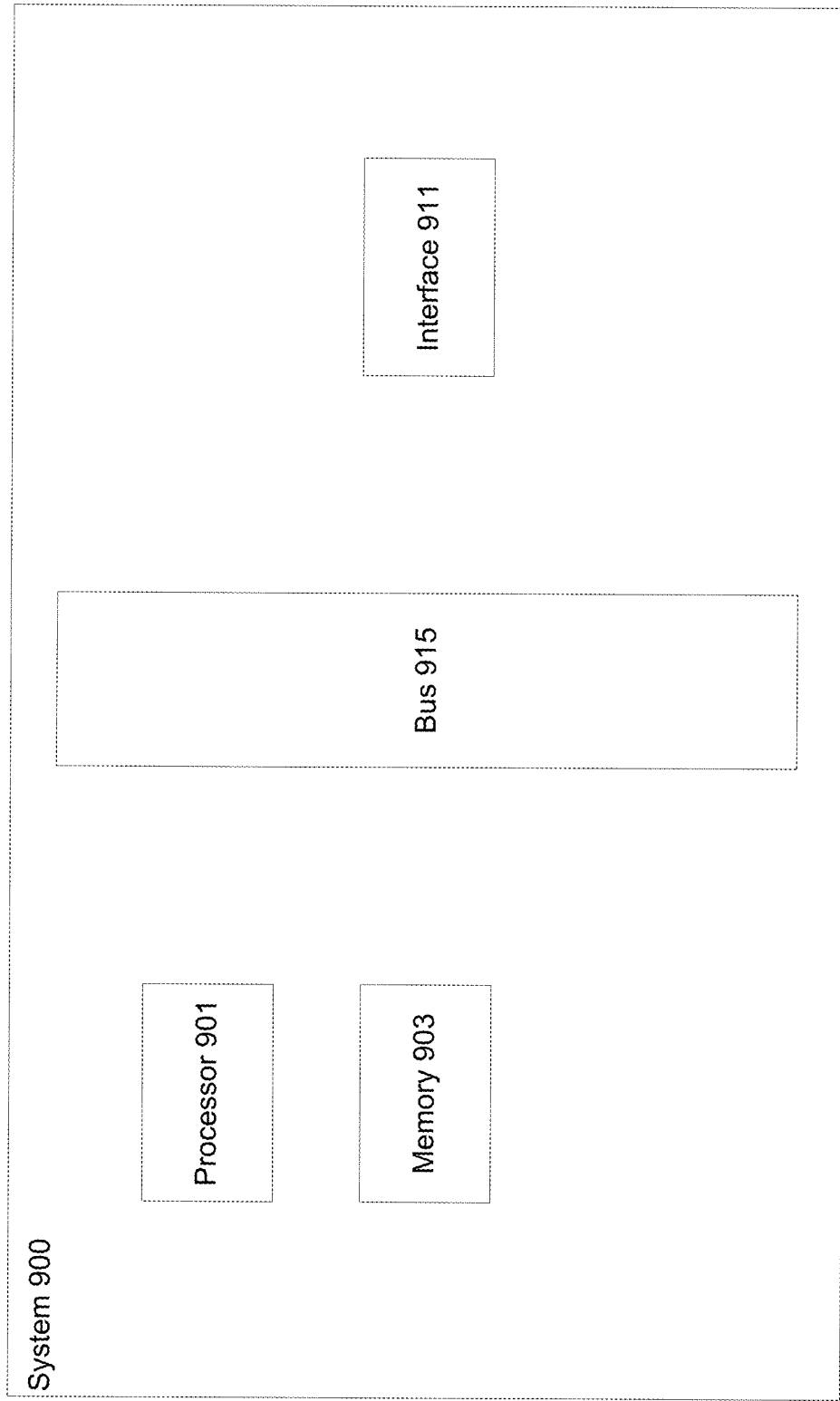
FIG. 9 illustrates an example of a processing system, configured in accordance with some embodiments.

FIG. 9 illustrates an example of a processing system configured in accordance with some embodiments. According to particular embodiments, a system 900 suitable for implementing particular embodiments of the present invention includes a processor 901, a memory 903, an interface 911, and a bus 915 (e.g., a PCI bus or other interconnection fabric). In various embodiments, system 900 may be configured to operate as one or more system components, such as client device, encoder, or multiview module. When acting under the control of appropriate software or firmware, the processor 901 is responsible for configuring and implementing encoding operations or mutliview operations, as discussed above. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is an encoder configured to configure and implement the encoding of media streams. For example, the system 900 may be configured as encoder 110 shown in FIG. 1. In various embodiments, additional instances of system 900 may also be used to implement other components, such as a client device and a multiview module. More specifically, additional instances of system 900 may also be used to implement client device 108 and multiview module 112 shown in FIG. 1. Although particular embodiments are described, it should be recognized that a variety of alternative configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A system comprising:
a processing device comprising one or more processors configured to generate a first display configured to represent a private computing environment associated with a user, and configured to generate a second display configured to represent a shared computing environment associated with the user;
an encoder configured to generate a packetized data stream representing the second display; and
a multiview module comprising a decoder configured to generate a third display configured to represent a unified view of a plurality of active shared computing environments associated with a plurality of users, the decoder being further configured to decode at least one packetized data stream representing at least one of the plurality of active shared computing environments.

2. The system of claim 1, wherein the shared computing environment is a shared workspace in a content sharing computing platform, and wherein the unified view comprises a plurality of display windows each representing one of the plurality of active shared computing environments.

3. The system of claim 1, wherein the processing device, the encoder, and the multiview module are implemented within a personal computer.

4. The system of claim 1, wherein the decoder is configured to simultaneously decode at least two of the plurality of packetized data streams.

5. The system of claim 1, wherein contents for the first display and contents for the second display are determined based on a user input received at the processing device.

6. The system of claim 1, wherein the first display is included in a plurality of first displays, wherein the second display is included in a plurality of second displays, wherein the third display is included in a plurality of third displays, and wherein a number of first displays, a number of second displays, and a number of third displays are scalable.

7. The system of claim 1, wherein the encoder and the multiview module are included in a single device.

8. The system of claim 1, wherein the encoder is configured to implement lossless compression, and wherein the encoder and decoder are coupled to a packet switching network.

9. The system of claim 1, wherein the first display and the third display are displayed in a single monitor.

10. A method comprising:
determining a plurality of configuration parameters associated with a content sharing computing platform, the plurality of configuration parameters identifying a plurality of users;
generating, using one or more processors of a processing device, a first display capable of representing a private computing environment associated with a user of the plurality of users, and a second display capable of representing a shared computing environment associated with the user;
generating, using an encoder, a packetized data stream representing the second display; and
generating, using a multiview module comprising a decoder, a third display capable of representing a view of at least one of a plurality of active shared computing environments associated with the plurality of users.

11. The method of claim 10, wherein the shared computing environment is a shared workspace in a content sharing computing platform, and wherein the unified view comprises a plurality of display windows each representing one of the plurality of active shared computing environments.

12. The method of claim 10, wherein the generating of the second display further comprises:
generating a packetized data stream representing the second display; and
wherein the generating of the third display further comprises:
decoding a plurality of packetized data streams representing the plurality of active shared computing environments.

13. The method of claim 12, wherein the generating of the third display comprises:
decoding, using the decoder, at least two of the plurality of packetized data streams simultaneously.

14. The method of claim 10, wherein contents for the first display and contents for the second display are determined based on a user input received at the processing device.

15. The method of claim 10, wherein the first display is included in a plurality of first displays, wherein the second display is included in a plurality of second displays, wherein the third display is included in a plurality of third displays, and wherein a number of first displays, a number of second displays, and a number of third displays are scalable.

16. A device comprising:
one or more processors configured to generate a first display capable of displaying a private computing environment associated with a user, and configured to generate a second display configured to represent a shared computing environment associated with the user;
an encoder configured to generate a packetized data stream representing the second display;
a decoder configured to generate a third display configured to represent a view of at least one of a plurality of active shared computing environments associated with a plurality of users, the decoder being further configured to decode at least one of a plurality of packetized data streams representing the plurality of active shared computing environments; and
a communications interface configured to couple the encoder and the decoder to a communications network.

17. The device of claim 16, wherein the shared computing environment is a shared workspace in a content sharing computing platform, and wherein the unified view comprises a plurality of display windows each representing one of the plurality of active shared computing environments.

18. The device of claim 16, wherein contents for the first display and contents for the second display are determined based on a user input.

19. The device of claim 16, wherein the first display is included in a plurality of first displays, wherein the second display is included in a plurality of second displays, wherein the third display is included in a plurality of third displays, and wherein a number of first displays, a number of second displays, and a number of third displays are scalable.

20. The device of claim 16, wherein the encoder, the decoder, and the communications interface are included within a personal computer.

* * * * *